(12) United States Patent
Cutler

(10) Patent No.: US 7,443,807 B2
(45) Date of Patent: *Oct. 28, 2008

(54) SYSTEM AND PROCESS FOR DISCOVERY OF NETWORK-CONNECTED DEVICES

(75) Inventor: Ross Cutler, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 855 days.

This patent is subject to a terminal disclaimer.

(21) Appl. No.: 10/788,907

(22) Filed: Feb. 28, 2004

(65) Prior Publication Data

US 2005/0190768 A1 Sep. 1, 2005

Related U.S. Application Data

(63) Continuation-in-part of application No. 10/462,243, filed on Jun. 16, 2003, now Pat. No. 6,934,370.

(51) Int. Cl.
*H04L 12/28* (2006.01)
*G06F 15/16* (2006.01)

(52) U.S. Cl. ..................... 370/254; 709/204
(58) Field of Classification Search ........... 370/261
See application file for complete search history.

(56) References Cited

U.S. PATENT DOCUMENTS

| | | | |
|---|---|---|---|
| 3,790,717 A * | 2/1974 | Abramson et al. ......... 370/431 |
| 5,539,483 A | 7/1996 | Nalwa |
| 5,745,305 A | 4/1998 | Nalwa |
| 5,793,527 A | 8/1998 | Nalwa |
| 5,990,934 A | 11/1999 | Nalwa |
| 6,005,611 A | 12/1999 | Gullichsen et al. |
| 6,043,837 A | 3/2000 | Driscoll, Jr. et al. |
| 6,061,793 A * | 5/2000 | Tewfik et al. ............... 713/176 |
| 6,111,702 A | 8/2000 | Nalwa |
| 6,115,176 A | 9/2000 | Nalwa |
| 6,128,143 A | 10/2000 | Nalwa |
| 6,141,145 A | 10/2000 | Rao |
| 6,144,501 A | 11/2000 | Nalwa |
| 6,175,454 B1 | 1/2001 | Hoogland et al. |
| 6,195,204 B1 | 2/2001 | Nalwa |
| 6,219,089 B1 | 4/2001 | Driscoll, Jr. et al. |
| 6,219,090 B1 | 4/2001 | Nalwa |
| 6,222,683 B1 | 4/2001 | Hoogland et al. |
| 6,285,365 B1 | 9/2001 | Nalwa |
| 6,313,865 B1 | 11/2001 | Driscoll, Jr. et al. |
| 6,331,869 B1 | 12/2001 | Furlan et al. |
| 6,337,708 B1 | 1/2002 | Furlan et al. |
| 6,341,044 B1 | 1/2002 | Driscoll, Jr. et al. |

(Continued)

*Primary Examiner*—Chau Nguyen
*Assistant Examiner*—Timothy J Weidner
(74) *Attorney, Agent, or Firm*—Lyon & Harr, LLP; Richard T. Lyon

(57) ABSTRACT

A system and process for discovery between endpoint component devices and computing devices residing in the same delimited space, such as conference room, in cases where the devices are connected to a common local network, is presented. The present invention allows a device in the space to discover the presence and network address of another device in the space, which then allows the first device to negotiate with the discovered device to facilitate the transfer of data and other communications over the common network. However, this discovery is accomplished without the use of the common network, and is limited to discovering devices residing in the same delimited space also containing the discoverable devices.

17 Claims, 6 Drawing Sheets

U.S. PATENT DOCUMENTS

| | | |
|---|---|---|
| 6,346,967 B1 | 2/2002 | Gullichsen et al. |
| 6,356,296 B1 | 3/2002 | Driscoll, Jr. et al. |
| 6,356,397 B1 | 3/2002 | Nalwa |
| 6,369,818 B1 | 4/2002 | Hoffman et al. |
| 6,373,642 B1 | 4/2002 | Wallerstein et al. |
| 6,388,820 B1 | 5/2002 | Wallerstein et al. |
| 6,392,687 B1 | 5/2002 | Driscoll, Jr. et al. |
| 6,424,377 B1 | 7/2002 | Driscoll, Jr. et al. |
| 6,426,774 B1 | 7/2002 | Driscoll, Jr. et al. |
| 6,459,451 B2 | 10/2002 | Driscoll, Jr. et al. |
| 6,466,254 B1 | 10/2002 | Furlan et al. |
| 6,480,229 B1 | 11/2002 | Driscoll, Jr. et al. |
| 6,493,032 B1 | 12/2002 | Wallerstein et al. |
| 6,515,696 B1 | 2/2003 | Driscoll, Jr. et al. |
| 6,539,547 B2 | 3/2003 | Driscoll, Jr. et al. |
| 6,583,815 B1 | 6/2003 | Driscoll, Jr. et al. |
| 6,593,969 B1 | 7/2003 | Driscoll, Jr. et al. |
| 6,597,520 B2 | 7/2003 | Wallerstein et al. |
| 6,700,711 B2 | 3/2004 | Nalwa |
| 6,741,250 B1 | 5/2004 | Furlan et al. |
| 6,756,990 B2 | 6/2004 | Koller |
| 6,885,509 B2 | 4/2005 | Wallerstein et al. |
| 6,924,832 B1 | 8/2005 | Shiffer et al. |
| 7,130,998 B2 * | 10/2006 | Balfanz et al. ............... 713/155 |
| 7,171,475 B2 * | 1/2007 | Weisman et al. ............. 709/227 |
| 7,185,199 B2 * | 2/2007 | Balfanz et al. ............... 713/168 |
| 2002/0080800 A1 * | 6/2002 | Lee et al. ................ 370/395.54 |
| 2002/0152314 A1 * | 10/2002 | Hayek et al. ................. 709/227 |
| 2003/0149874 A1 * | 8/2003 | Balfanz et al. ............... 713/168 |
| 2004/0003051 A1 * | 1/2004 | Krzyzanowski et al. ...... 709/217 |
| 2004/0008423 A1 | 1/2004 | Driscoll, Jr. et al. |
| 2004/0022272 A1 * | 2/2004 | Rodman et al. .............. 370/494 |
| 2004/0088548 A1 * | 5/2004 | Smetters et al. .............. 713/175 |
| 2004/0098581 A1 * | 5/2004 | Balfanz et al. ............... 713/155 |
| 2004/0103280 A1 * | 5/2004 | Balfanz et al. ............... 713/169 |
| 2004/0107366 A1 * | 6/2004 | Balfanz et al. ............... 713/201 |
| 2004/0133640 A1 * | 7/2004 | Yeager et al. ................ 709/204 |
| 2004/0133704 A1 * | 7/2004 | Krzyzanowski et al. ...... 709/250 |
| 2004/0215974 A1 * | 10/2004 | Conley et al. ................ 713/201 |
| 2004/0252384 A1 | 12/2004 | Wallerstein et al. |
| 2004/0254982 A1 | 12/2004 | Hoffman et al. |
| 2004/0266449 A1 * | 12/2004 | Smetters et al. ........... 455/452.1 |
| 2004/0268119 A1 * | 12/2004 | Smetters et al. .............. 713/155 |
| 2005/0018687 A1 * | 1/2005 | Cutler ..................... 370/395.2 |
| 2005/0100166 A1 * | 5/2005 | Smetters et al. .............. 380/277 |
| 2005/0125669 A1 * | 6/2005 | Stewart et al. ............... 713/171 |
| 2005/0129240 A1 * | 6/2005 | Balfanz et al. ............... 380/270 |
| 2006/0143458 A1 * | 6/2006 | Tie et al. .................... 713/176 |

* cited by examiner

SYSTEM AND PROCESS FOR DISCOVERY OF NETWORK-CONNECTED DEVICES

CROSS-REFERENCE TO RELATED APPLICATIONS

This application is a continuation-in-part of a prior application entitled "System And Method For Communicating Audio Data Signals Via An Audio Communications Medium" which was assigned Ser. No. 10/462,243 and filed Jun. 16, 2003.

BACKGROUND

1. Technical Field

The invention is related to discovery among network-connected devices, and more particularly to a system and process for a discovering electronic device to discover the presence and network address of a discoverable electronic device connected to the same network and located in the same delimited space, without employing the network.

2. Background Art

Communication between electronic devices connected via a local network is a common requirement in a variety of applications, such as found in ubiquitous computing environments and some teleconferencing systems. For example, ubiquitous computing revolves around extending computational activities beyond the current desktop model and into the environment. In future homes and offices, access to computing should be as natural as access to lighting. Users should not be required to go to a special place (i.e., the desktop) to interact with the computer. Rather, the computer should be available to interface with the user anywhere in the home or office (or more generally anywhere in an arbitrarily large environment), through whatever set of devices is available, be they fixed or carried by the user. In order to affect this ubiquitous computing environment the various endpoint components and computing devices (hereinafter referred to collectively as devices) need to communicate with each other. One typical way this is accomplished is via communication over a conventional local computer network. This can be done either using wired or wireless connection schemes.

In the context of teleconferencing, meetings are an important part of everyday life for many workgroups. A variety of live teleconferencing systems are available commercially to enhance and archive these meetings. Both recorded meetings and live video conferences require audio-visual capturing equipment. One such system generally referred to as a Distributed Meeting (DM) system provides high quality multi-party conferencing and recording of meetings, as well as rich browsing of archived meetings enhanced through a number of analysis techniques. DM systems typically have multiple cameras that simultaneously capture different sub-events occurring in a space where an event occurs, such as a meeting room, to give a rich experience to local and remote meeting participants. These capture devices are all synchronized to provide an integrated, scalable system and method for two-way conferencing, broadcasting, recording and viewing meetings or other events. In particular, a DM system's cameras can include a 360-degree camera centrally positioned to monitor in 360 degrees the space in which the event occurs; a remote view camera positioned so as to capture a view of event participants in the meeting room; a presenter view camera positioned so as to capture a view of the front of the meeting room where a presenter is typically presenting; and a whiteboard capture camera positioned so as to capture strokes written on a whiteboard. A DM system also typically has one or more microphone devices or microphone arrays that simultaneously capture audio data that is synchronized with the image data recorded by the various cameras. A given microphone device or array can be used to determine the direction from which an event participant is speaking by using sound source localization. The 360 degree camera, presenter view camera and remote view camera all can have microphone arrays associated with them. A DM system can also include a projector for projecting meeting or other materials onto a screen and a graphics capture device is used to capture graphics data used in the meeting, such as electronic slides that are part of an electronic presentation. A monitor or television may also be included to display one or more remote participants or other meeting/event materials. Further, a DM system also can have a kiosk that is used to control broadcast, recording and playback of the meeting or other event. In addition, at least one server or other suitably configured computer that is capable of storing and distributing the captured data to one or more clients in network connection with the server can be included.

For live meetings using a DM system, the system broadcasts the multimedia meeting streams to participants, who use a network for low-latency duplex voice and data communication. The meetings can also be recorded and viewed on-demand. These viewing and archiving features can be useful not only to remote users who are not at the site of the meeting, but also to participants who do attend the meeting. To facilitate the viewing and archiving of a live meeting by local participants, the participant will typically employ a portable computing device, such as a notebook/laptop computer or even a handheld computing device. For example, a local meeting participant may want to use their notebook computer to record portions of the meeting, such as the audio and/or what is written on a whiteboard. To accomplish this task, the network addresses for the endpoint component associated with the microphone array used to capture the audio portion of the meeting, and the whiteboard camera (or other conventional whiteboard capture device), must be known to or discovered by the notebook computer.

Thus, in a DM scenario there are many different devices that must communicate with each other. One effective way of accomplishing this task is to connect all the devices to a conventional local computer network. Here again, this can be done either using wired or wireless connection schemes.

However, in the foregoing scenarios the various devices may be new to the environment (e.g., a participant's notebook computer) or a fixed device may be activated and brought on-line to the network after having been deactivated for a period of time (e.g., the various cameras employed in a DM system). As a result, the various components and computing devices will not know of each others existence. Accordingly, a key to establishing communications between devices over a network is for the devices to discover each other. Once a connection is established, a device can control or be controlled by other devices, send or receive event signals, and transfer data between applications.

Universal Plug and Play (UPnP) is a standard framework that enables discovery between components and devices connected to a network, and is the typical method for establishing communications. In general, this framework typically requires a device to multicast its address over the network. Other components or devices seeking communication with the multicasting device would then use the address to establish communications. However, this method of discovery presents serious security issues. For example, it allows any device connected to the network to find and communicate with any other device on the network regardless of their relative locations. This can be a problem in the context of a distributed meeting because it is often desired to restrict control of the conference room endpoint components to participants actually in the conference room. For example, it may be desired by the attending participants to control what portions of a meeting are recorded via the endpoint components. If persons outside the conference room can readily access and remotely control these endpoint components then the desired control cannot be exercised. Further, unless potentially elaborate security measures are taken, unauthorized access to a device is a possibility using the standard UPnP discovery methods. As a result of these concerns, among others, businesses having local networks often disable the multicast feature. Thus, there is no way for devices to discover each other and so the advantages of UPnP cannot be realized.

Thus, there is a need for alternate discovery techniques that establish communications between endpoint components and computing devices over a network in a manner that localizes the communications links to a prescribed space, such as a conference room. In addition, there is a need for alternate discovery techniques that can be combined with UPnP to allow UPnP to work even in environments with the multicast capability disabled.

SUMMARY

The present invention is directed toward a system and process for discovery between endpoint components and computing devices (hereinafter referred to collectively as devices) residing in the same delimited space, such as conference room, in cases where the devices are connected to a common local network. The present invention allows a device in the space to discover the presence and network address of another device in the space, which then allows the first device to negotiate with the discovered device to facilitate the transfer of data and other communications over the common network. However, unlike prior schemes this discovery is accomplished without the use of the common network, and so is not affected by the disablement of the network multicast feature typically employed for discovery purposes. In addition, discovery is limited to discovering devices residing in the space also containing the discoverable devices.

More particularly, in one embodiment of the present discovery system and process, the network address assigned to the discoverable device located within the delimited space is transmitted by that device. This signal is not transmitted via the common network. In addition, it is transmitted in a manner that substantially limits its reception to the delimited space, thereby precluding the aforementioned localization issues associated with discovery via a network. The signal can also be periodic in nature, if desired, so that it is received by new devices coming into the space. The discovering device receives the signal and uses the received network address to establish communications via the common network with the discoverable device that transmitted the address. The aforementioned signal can further include a signature expressly indicating the type of electronic device that sent the network address. It is noted that the fact that such a signal is sent by a device also inherently indicates it is present in the space and is accessible via said common network. Whenever the signal includes the discoverable device's signature, the discovering device receiving the signal would only initiate communications with that device if the discoverable device is of the type that it is desired contact. In one version of this first discovery embodiment, the signature is in the form of an identifier that distinguishes the associated discoverable electronic from all other discoverable electronic devices in the space.

In another embodiment of the present discovery system and process, a discovering device transmits a signal, which requests the network address assigned to a discoverable device in the space to be transmitted to the discovering device. This signal is also not transmitted over the network, is of a type that substantially limits its reception to the delimited space, and can be periodic in nature or not as desired. A discoverable device receiving the request signal transmits a reply signal having the same characteristics and which includes data representing the requested network address. Additionally, the request signal can include data specifying the type of discoverable device it is desired to obtain the network address for, whereby only a device of the specified type transmits a reply signal. Alternately, if the device type is not included in the request, the reply signal transmitted by the discoverable device can include the aforementioned device signature, thereby allowing the discovering device to determine whether the replying device is of a type it wants to establish communications with over the network.

In yet another embodiment of the present discovery system and process, a discoverable device within the space transmits a signal including the aforementioned device signature. This transmission can be periodic so as to be received by discovering devices newly entering, or coming online within, the delimited space. The discovering device receives the signature signal, and if the discoverable device is of the type it is desired to establish communications with, transmits the aforementioned request signal. As in the previous embodiment, the discoverable device receives the request and transmits a reply signal with its network address. The discovering device then receives the reply signal and establishes communications with the discoverable device over the common network. Here again, the signature, request and reply signals are not transmitted via the network and are transmitted in a manner that substantially limits their reception to the delimited space.

The foregoing embodiments of the discovery system and process can be implemented using infrared (IR) or audio signals. In the case of IR-based discovery, each discoverable and discovering device includes an IR transmitter and/or receiver as needed to transmit or receive the aforementioned signals, depending on which discovery embodiment is employed. It is noted that the IR transmitters are powerful enough to extend throughout the delimited space.

In the case of audio-based discovery, the discoverable and discovering devices include a microphone and loudspeaker, as appropriate, for receiving and transmitting audio signals respectively. The audio signal transmitted can be audible or inaudible. Inaudible audio signals are especially appropriate if the transmitted signal is periodic, so as not to distract people in the delimited space. If an inaudible signal is employed, it can be a low amplitude audio signal inaudible to humans that has data embedded in it in the form a conventional audio watermark. In this case the receiving device obtains the desired data by ascertaining the content of the audio watermark. If an audible signal is employed, the data is encoded in the signal using any appropriate conventional audio encoding scheme (e.g., DTMF encoding), and the receiving device obtains the desired data by decoding the signal using the appropriate decoding scheme.

It is further noted that regardless of if IR or audio signals are employed, the signal can be encrypted for security purposes using any appropriate conventional encryption scheme. In such a case the device receiving the signal would decrypt it prior to obtaining the desired data. Another security measure that can be implemented to ensure only discovering devices present in the delimited space can obtain the network address of a discoverable device also located in the space, involves including a confirmation actuator on the discoverable device. This actuator must be physically activated by person within the delimited space before the discoverable device will transmit a signal containing its network address. In embodiments where a discoverable device's signature is transmitted in a separate signal from the network address, it can be required that the aforementioned actuator be activated prior to the signature signal being transmitted as well.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
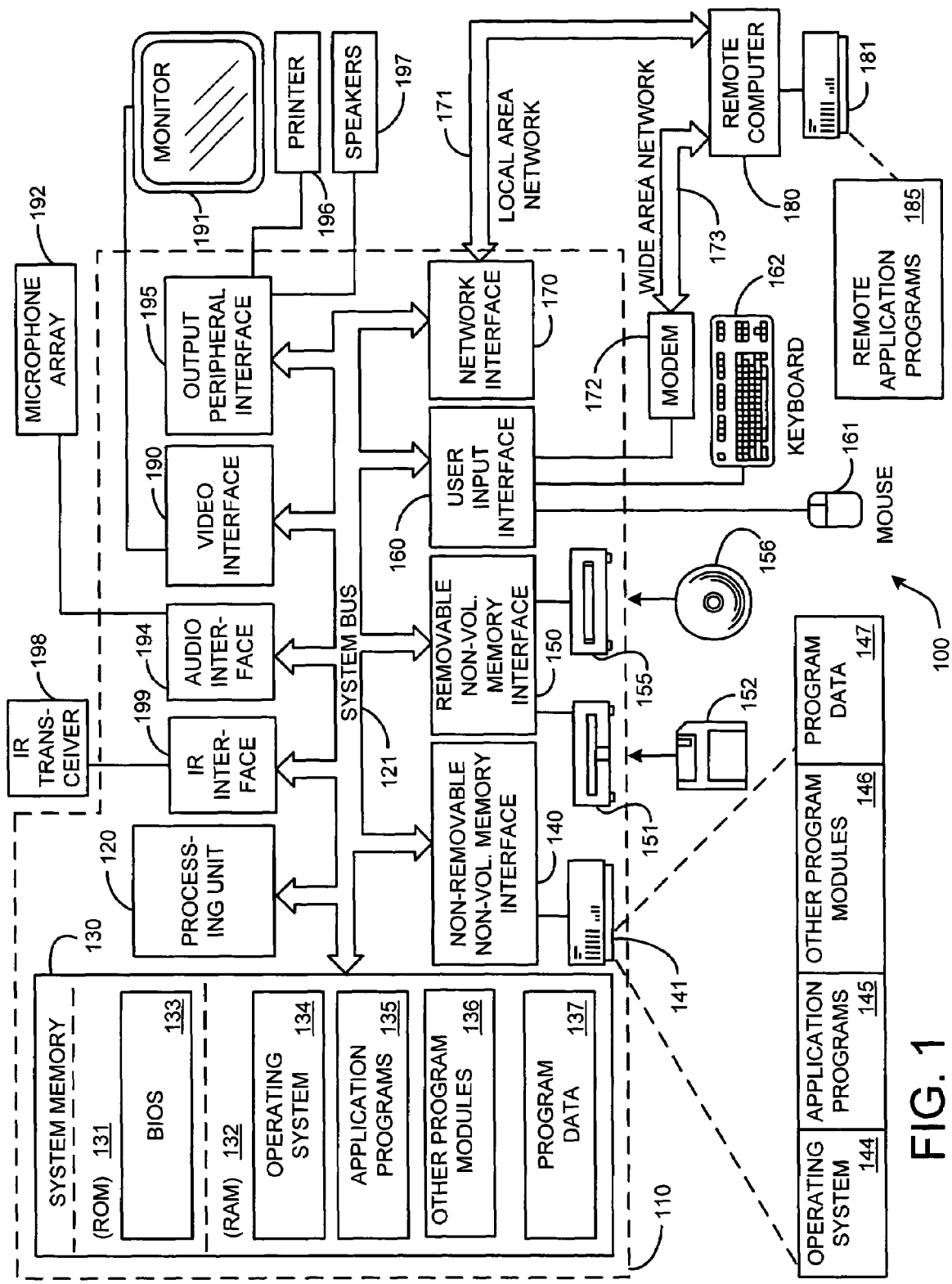
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a microphone array 192, and/or a number of individual microphones (not shown) are included as input devices to the personal computer 110. The signals from the microphone array 192 (and/or individual microphones if any) are input into the computer 110 via an appropriate audio interface 194. This interface 194 is connected to the system bus 121, thereby allowing the signals to be routed to and stored in the RAM 132, or one of the other data storage devices associated with the computer 110. Further, an infrared (IR) transceiver 198 is included as an input/output device to the personal computer 110. The signals to and from the IR transceiver 198 are input into and output from the computer 110 via an appropriate IR interface 199, which is connected to the system bus 121. It is noted that rather than an IR transceiver, an IR transmitter or IR receiver could be employed instead, as desired.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 System and Process for Discovering Networked Endpoint Components and Computing Devices The exemplary operating environment having now been discussed, the remaining part of this description section will be devoted to a description of the program modules embodying the invention. Generally, the system and process according to the present invention involves discovery between endpoint components and computing devices (hereinafter referred to collectively as devices) in a delimited space, such as conference room, in cases where the devices are connected to the same local network. As described previously, discovery is the first step in order for two devices to communicate. More particularly, the present invention allows a device in a space to discover the presence and network address of another device in the space, which then allows the first device to negotiate with the discovered device for data transfer, control, and so on.

The foregoing discovery system and process can be implemented using infrared (IR) and audio. Each of these scenarios will be described in the sections to follow.

2.1 Infrared-Based Discovery

In general, infrared (IR) based discovery in accordance with the present system and process requires that any device that is to be discovered in a space include an IR transmitter. These IR devices are conventional and used in a variety of computing devices. As such no detailed description of them need be provided herein. In addition, any device that is to discover another device in the space must have an IR receiver.

In cases where a device can act as either a discovering or discoverable device, it would require both an IR transmitter and receiver.

Figure 2:
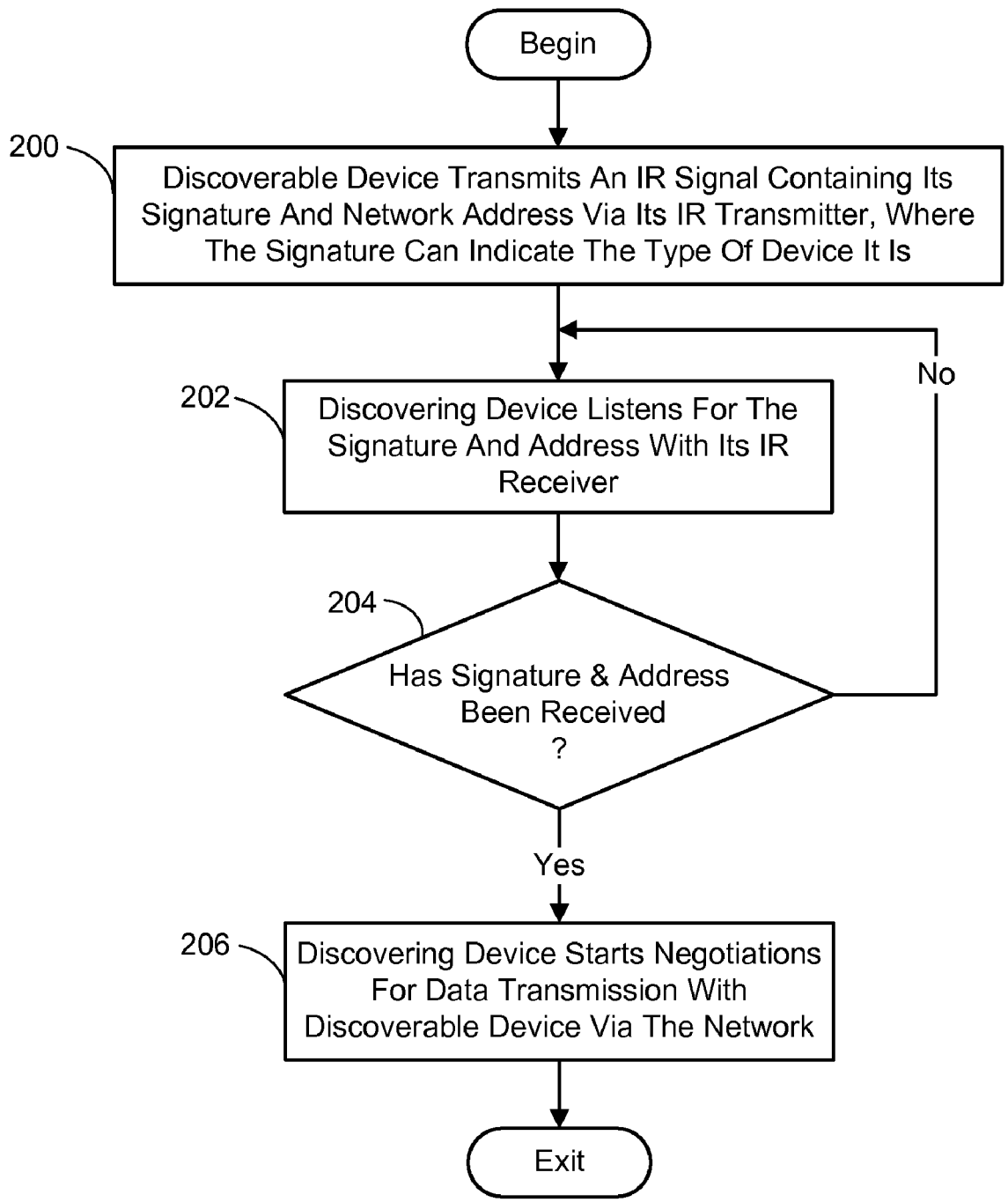
FIG. 2 is a flow chart diagramming an exemplary process for implementing one embodiment of the present discovery technique using IR signals.

Referring to FIG. 2, an example of implementing the present IR-based discovery technique for a first discovery embodiment is provided. This involves first having the device that is to be discovered transmits an IR signal containing its signature and network address via its IR transmitter using conventional methods (process action 200). This signal can be periodic in nature. Meanwhile, another endpoint component or computing device in the space listens for the signature and address with its IR receiver (process action 202). When it is determined that this information has been received (process action 204), the discovering device starts negotiations for data transmission (e.g., UPnP) via the common local network (process action 206). It is noted that the signature of a device can indicate several things such as the type of device, that it is a device connected to the same local network as the discovering device, and simply that the device is present in the space. While the latter two items can be assumed to be inherent in the fact that a device is transmitting a signature within the space, the first item can require that some unique identifier be used that distinguishes the device from all other discoverable devices in the space. Ideally, the unique identifier representing a device's signature would be made as small as possible, and a prescribed list of identifiers each identifying its corresponding device would be known to all the devices capable of discovering other devices in the space.

Figure 3:
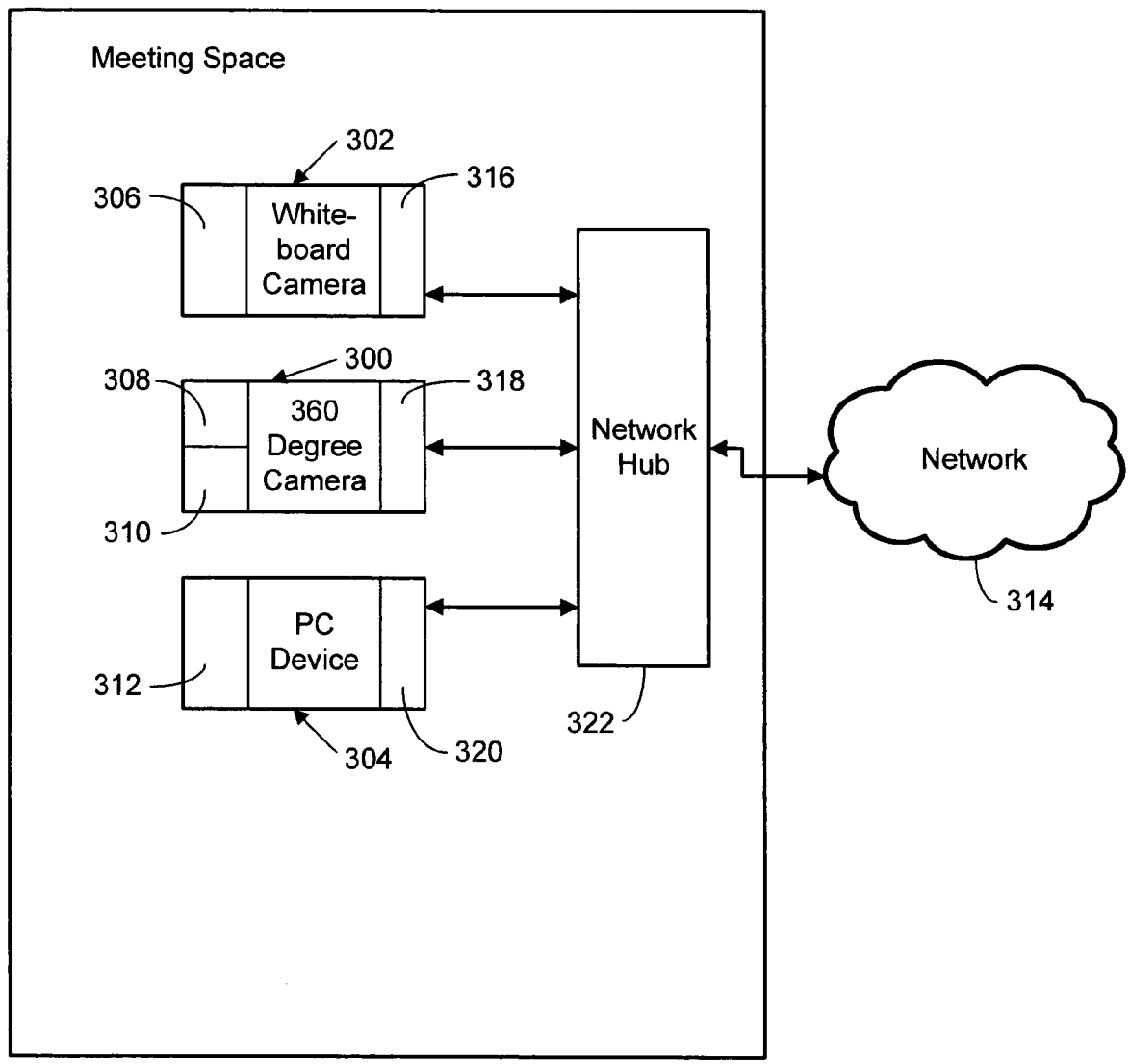
FIG. 3 is a diagram illustrating one embodiment to the communication links between endpoint components and a computing device in a DM setting using the IR-based discovery process of FIG. 2.

Referring now to FIG. 3, an example of the foregoing IR-based discovery in the aforementioned Distributed Meeting (DM) setting might involve two endpoint components, i.e., a 360 degree camera 300 and a whiteboard camera 302) within a meeting space establishing communications with each other to synchronize data capture and the like. In addition, a portable PC device 304 (e.g., notebook computer, tablet-type PC, and so on) is placed in the space by a meeting participant the purpose of discovering the 360 degree camera 300 in order to obtain and record portions of the meeting such as the audio and video streams captured by the camera 300. First, assume the aforementioned 360 degree camera 300 needs to establish communications over the local network 314 with the whiteboard camera 302 to synchronize data capture. For this purpose, the white board camera 302 would include an IR transmitter 306, and a network connection 316 for connecting to the network 314 via a network hub 322. The 360 degree camera 300 needs to know the IP address of the whiteboard camera 302 in order to establish communications with it over the local network 314. As indicated previously, this is accomplish by having the whiteboard camera 302 periodically transmit its signature and network address in an signal output by its IR transmitter 306. The 360 degree camera 300, which is equipped with an IR receiver 308, and a network connection 318 for connecting to the network 314 via the network hub 322, listens for a signal from the whiteboard camera 302 (as identified by its transmitted signature) and obtains the network address of the device. Communications between the cameras 300, 302 is then established by the 360-degree camera over the local network 314 in a conventional manner via their network connections 316, 318 and the hub 322. As the 360 degree camera 300 is also a discoverable device, it includes an IR transmitter 310 as well. The PC device 304 needs to discover the 360 degree camera 300 in order to establish communications with it over the network to capture the desired meeting data. Thus, the PC device 304, which is equipped with at least an IR receiver 312, and a network connection 320 for connecting to the network 314 via a network hub 322, listens for a signal from the 360 degree camera 300 (as identified by its transmitted signature) and obtains the network address of the device. Communications between the camera 300 and the PC device 304 are then established by the computer over the local network 314 in a conventional manner using their network connections 318, 320 and the hub 322. Thus, IR-based discovery is accomplished in a seamless manner with no user intervention required.

It is noted that the aforementioned IR transmitter should in some circumstances exhibit more power than a typical IrDA transmitter, which is limited to a 1 m range. More particularly, the IR transmitter's power should be strong enough to extend throughout the space. For example, the IrDA transceiver (Part No. GP2W2001YK) produced by Sharp Microelectronics of the Americas located in Camas, Wash., which has a 5 meters transmit range, could be employed in a conference room setting as most conference rooms are not larger than 5 meters in any direction.

IR-based discovery has important advantages over standard techniques, such as aforementioned network-based multicast scheme, which solve the problems addressed previously. For instance, IR-based discovery is inherently local. IR signals typically stay within a room, as they do not penetrate walls, go through glass, and are not easily reflected off of most wall surfaces. Thus, in a conference room setting, the signals could not be received outside the room. In addition, the use of the present IR-based discovery technique does not require any infrastructure changes. For example, as mentioned earlier the multicast feature in many local networks is disabled, which prevents discovery with protocols like UPnP. However, the present IR-based discovery technique allows devices within a delimited space to discover each other's network address, without the use of multicasting over the network. Thus, communication between devices can be established without any change to the network settings. In this way, IR-based discovery can be combined with UPnP to allow UPnP to work even in environments with the multicast feature disabled. Even if the multicast feature were not disabled on the local network, the use of the IR-based technique would be advantageous as it solves the aforementioned locality issue by only allowing devices present in the delimited space to discover each other.

2.2 Audio-Based Discovery

In general, audio-based discovery in accordance with the present system and process requires the devices to be discovered, as well as the devices performing the discovery, in a delimited space, to each include a loudspeaker and microphone (which can be one of the aforementioned microphone arrays employed in DM systems). It is noted that most portable PC devices already have these items, and they can be readily incorporated into any endpoint component.

Figure 4:
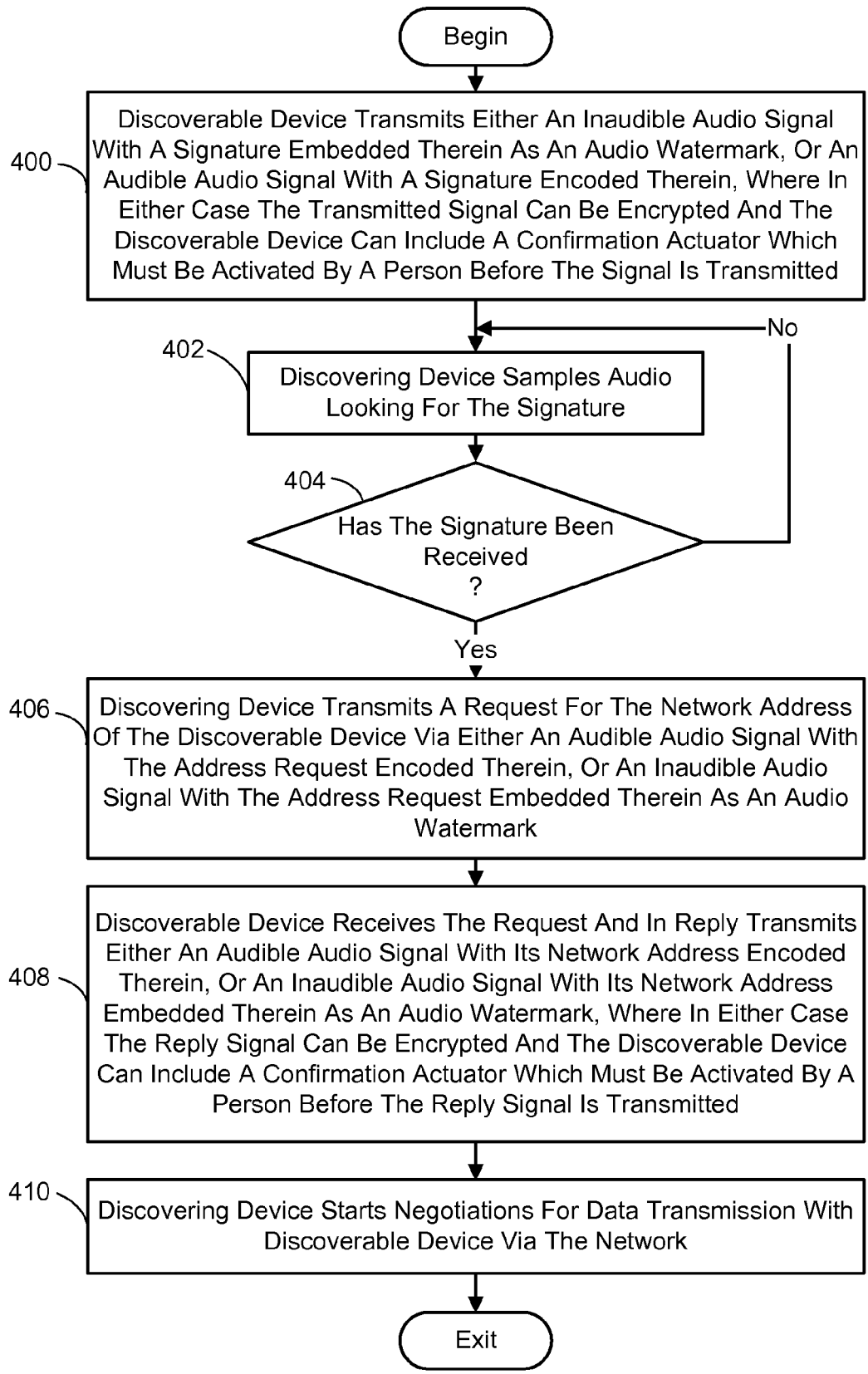
FIG. 4 is a flow chart diagramming an exemplary process for implementing another embodiment of the present discovery technique using audio signals.

Referring to FIG. 4, an example of implementing the present audio-based discovery technique using a second discovery embodiment is presented. This involves first having the device that is to be discovered transmit a low amplitude audio signal that is inaudible to humans, and which has an embedded signature, using its loudspeaker (process action 400). This signal can be periodic in nature. Another endpoint component or computing device in the space samples audio with its microphone looking for the signature (process action 402). When it is determined that the signature has been received (process action 404), the discovering device transmits an audible audio signal including a request for the network address of the device being discovered using its loudspeaker (process action 406). The device being discovered then receives the request via its microphone and transmits an audible audio signal in reply that includes its network address in encoded form (process action 408). The discovering device next starts negotiations for data transmission (e.g., UPnP) via the common local network to which the devices are connected using the received address (process action 410). It is noted that the signature transmitted by the device being discovered would have the same attributes as the one employed in the previously-described IR-based discovery technique.

The audio signal transmitted by the discoverable device that includes its signature can be an audible audio signal instead, if desired. Further, the audio signal transmitted by the discovering device to request a network address can alternately be an inaudible signal similar to the periodically transmitted signature. Similarly, the reply signal transmitted by the device being discovered can be of the inaudible type.

An inaudible audio signal is implemented in one embodiment of the present audio-based discovery technique by encoding the desired data (e.g., the device's signature, a request for a network address or the network address itself via a conventional watermark technique. In general, an audio watermark involves altering the frequency spectrum of an audio signal to embed a pattern. This pattern represents the data being encoded. In the context of producing an inaudible watermark encoded audio signal in accordance with the present system and process, the audio signal is low-amplitude noise, which is inaudible to a human, and which has been altered as described above to embed the desired data. These alterations do not change the inaudible nature of the signal. The use of inaudible signals has an advantage of not being a distraction to people in the space. This is particularly true in the case of the periodic signal.

As for audible audio signals, these can be implemented using any conventional audio-based encoding method, such as via the use of DTMF encoding. An advantage of using an audible signal is that it can have a relatively short duration in comparison to an inaudible signal employing watermarking techniques, even though providing the same amount of embedded data. For example, a typical network address can be encoded in an audible signal with a duration of 320 ms or less depending on the encoding used, whereas it would require an inaudible watermarked signal several seconds to encode the address. In addition, since the audio signals used to request an address and provide one in reply would occur infrequently, they would not present a significant distraction to people in the area even if they were audible. To the contrary, the use of an audible signal to request and provide a network address would alert the user to the fact that communication is being established between two devices in a space. Thus, in one preferred version of the present audio-based discovery technique, an inaudible periodic audio signal is used to transmit the signature of a discoverable device employing watermarked encoding, while the audio signals used to request a network address and provide the address in reply employ encoded audible signals.

Figure 5:
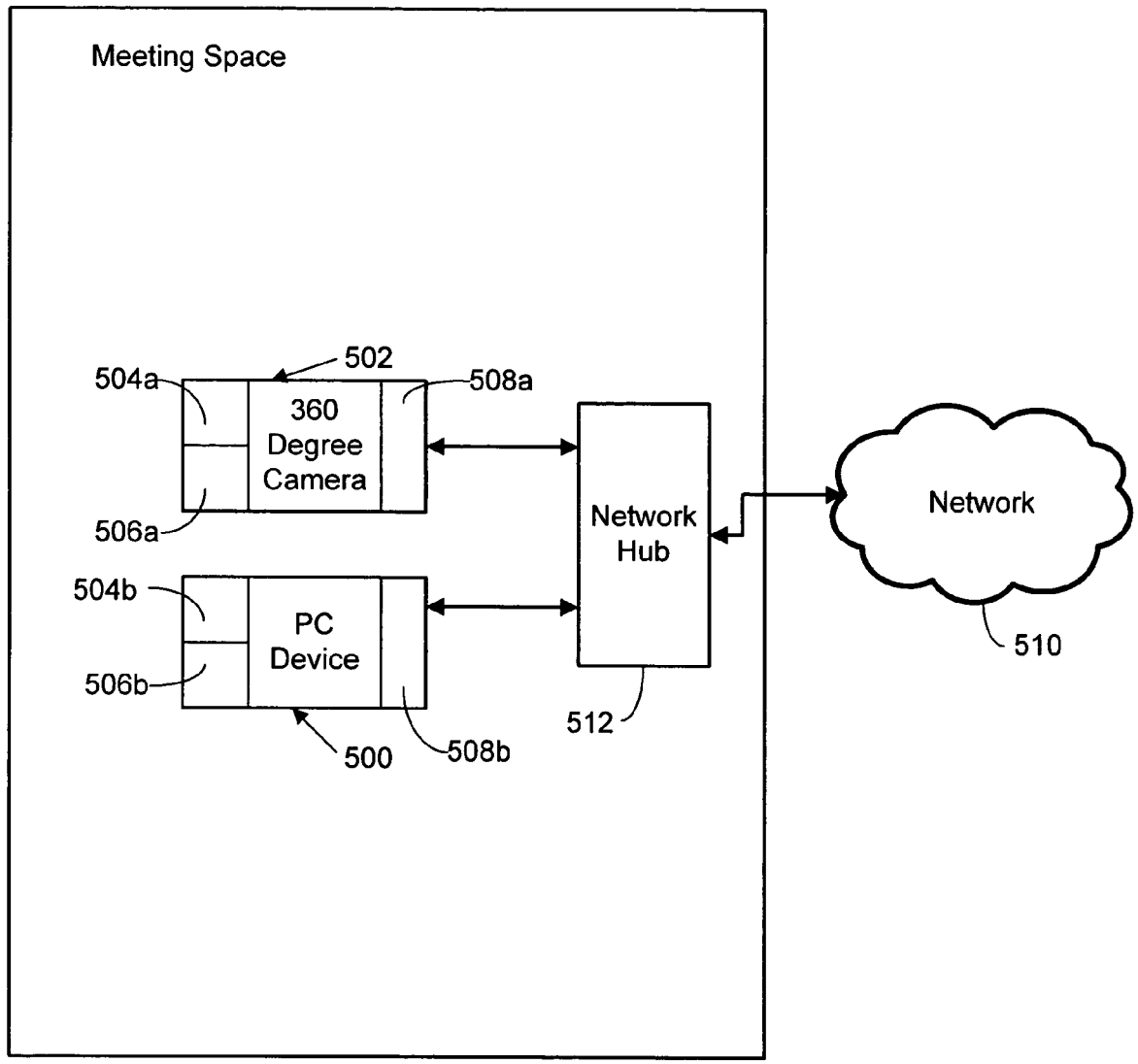
FIG. 5 is a diagram illustrating one embodiment of the communication links between the audio-based discovery process of FIG. 4.

Referring now to FIG. 5, an example of the foregoing audio-based discovery in the aforementioned Distributed Meeting (DM) setting might involve a meeting participant using their portable PC device 500 (e.g., notebook computer, tablet-type PC, and so on) to record portions of the meeting such as the audio and video streams captured by the aforementioned 360 degree camera 502. To accomplish this task, the participant's portable PC device 500 must first discover the camera's local network address. The camera 502 and portable PC device 500 are each equipped with a loudspeaker 504*a*, 504*b*, microphone 506*a*, 506*b*, and network connection 508*a*, 508*b* for connecting to the network 510 via a network hub 512. The camera 502 would periodically transmit a low amplitude inaudible audio signal that contains its signature encoded as an audio watermark. In one version of the present audio-based discovery technique, the signature was embedded as a 1-bit watermark in an inaudible audio signal, which is transmitted once every second. As indicated previously, the audio signal is made inaudible to humans so that it does not present a distraction in the meeting space. The participant's portable PC device 500 listens for a signal from the 360 degree camera 500 by recording about 1 second of audio and decoding any audio watermarks contained in the recorded block. If the 360 degree camera's signature (which is known to the PC device 500) is found in the recorded block of audio, the PC device transmits the aforementioned audible request for the camera's network address. As the request is of short duration (e.g., less than 500 ms), the fact that it is audible to humans will not present a significant distraction. The 360 degree camera 502 receives the audible request and replies with an audible signal encoded with its network address using a prescribed encoding scheme (e.g., DTMF encoding). Here again the reply is of short duration (e.g., less than 500 ms) and so will not constitute a distraction to the meeting participants even though it is audible. The PC 500 then decodes the audible signal received from the camera 502, thereby obtaining the network address of the device. Communications between the PC device 500 and the camera 502 are then established by the PC device over the local network 510 in a conventional manner using their network connections 508*a*, 508*b* and the hub 512. Thus, as with IR-based discovery, the present audio-based discovery technique is accomplished in a seamless manner with no user intervention required.

Like IR-based discovery, audio-based discovery has important advantages over standard techniques, such as aforementioned network-based multicast scheme, which solve the problems addressed previously. For instance, audio-based discovery is inherently local. Audio amplitudes decay rapidly as a function of distance from the source. The audio signals employed in the present audio-based discovery technique typically will not travel beyond the confines of the defined space, as they do not significantly penetrate walls, and if high frequency signals are used, they will be attenuated when reflected off of most wall surfaces. Thus, in a conference room setting, the signals would not be significantly detectable outside the room. In addition, as in the case of IR-based discovery, the use of the present audio-based discovery technique does not require any infrastructure changes. For example, as mentioned earlier the multicast feature in many local networks is disabled, which prevents discovery with protocols like UPnP. However, the present audio-based discovery technique allows devices within a delimited space to discover each other's network address, without the use of multicasting over the network. Thus, communication between devices can be established without any change to the network settings. In this way, audio-based discovery too can be combined with UPnP to allow UPnP to work even in environments with the multicast feature disabled. Additionally, even if the multicast feature were not disabled on the local network, the use of the audio-based technique would be advantageous as it solves the aforementioned locality issue by only allowing devices present in a delimited space to discover each other.

It is noted that the discovery scheme described previously in connection with the description of the present IR-based technique could also be implemented using audio signals having the characteristics described in this section. Similarly, audio signals as described above in connection with the present audio-based technique as implemented in the second discovery embodiment could be replaced with IR signals containing the same data.

2.3 Additional Features

Some additional features of the present discovery system and process applicable to both IR-based and audio-based techniques will now be described.

2.3.1 Discovering Device Initiated Discovery

Figure 6:
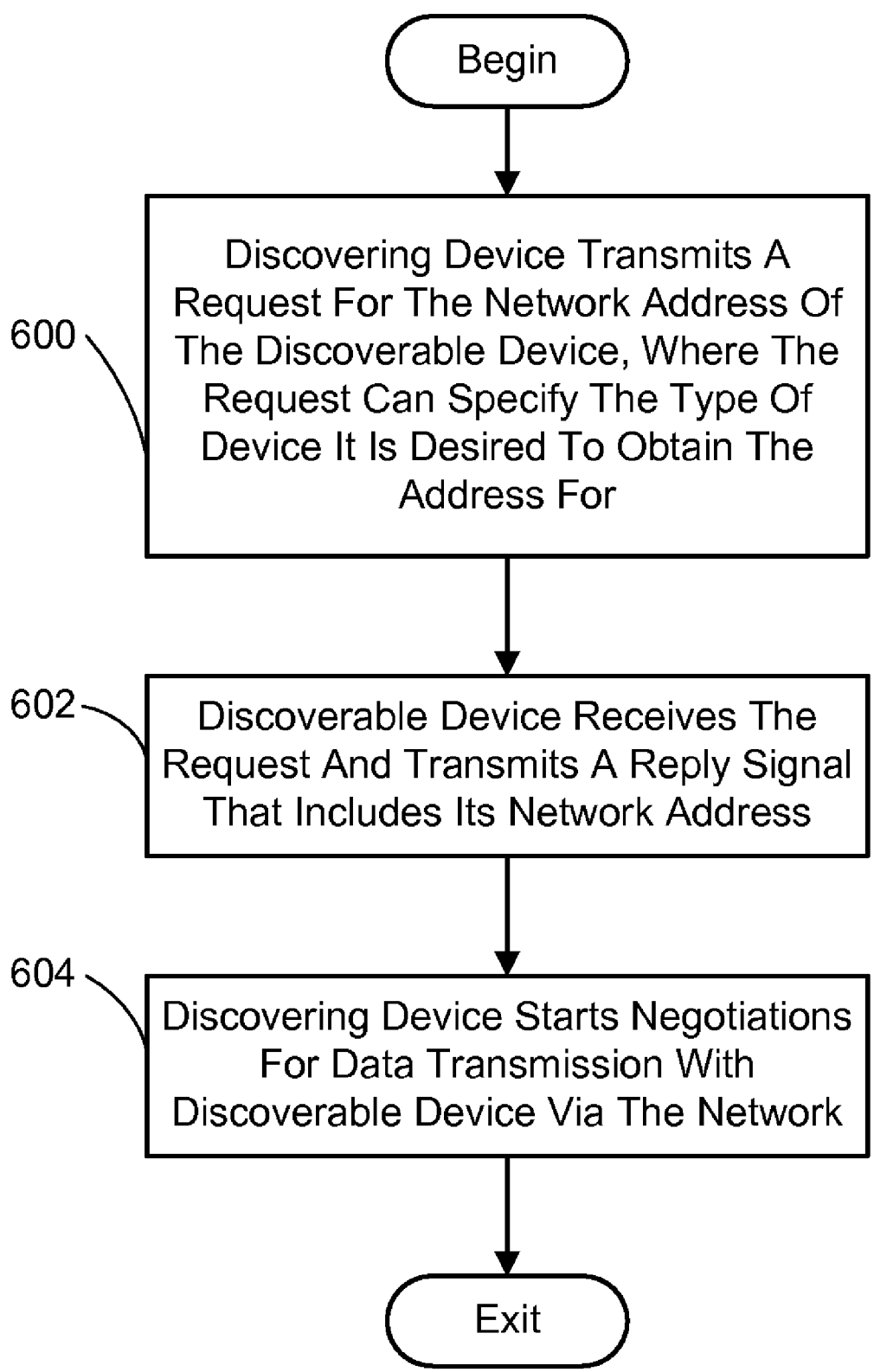
FIG. 6 is a flow chart diagramming an exemplary process for implementing yet another embodiment of the present discovery technique using either IR or audio signals.

While the foregoing discovery techniques involved a discoverable device initiating discovery by transmitting its signature (and in some cases its network address as well) within a delimited space, an alternate discovery embodiment would be for the discovering device to transmit a request for a network address instead. Referring to FIG. 6, in this alternate scenario, the aforementioned request signal would be transmitted first (process action 600). This could be made on a periodic basis or not, and could identify what particular device it is desired to obtain an address for in the request signal. The signals can be either IR or audio. In the case of the audio-based discovery technique, if the request is made periodic in nature, the use of an inaudible watermark encoded signal would be less distracting to people in the space. However, an audible signal could be used if such a distraction is not an overriding concern or the request is not periodic.

The discoverable device would reply to the request with a network address as before (process action 602). The discovering device then starts negotiations for data transmission (e.g., UPnP) via the common local network to which the devices are connected using the received address (process action 604).

If the request is general, such that replies from all discoverable devices in the space are solicited, then the reply signal would include both the device's network address and its signature. In this way the requesting device can ascertain what type of device is replying, thereby allowing the requesting device to select which device or devices it wants to establish communications with over the local network. If the request was specific as to the type of device, then the reply signal would not need to contain a device signature. However, as before, the mere fact that the request is answered by a device is indicative that the device is present in the space and that it is available for communications over the local network.

2.3.2 Encrypted Signals

As an added security measure one or more of the signals transmitted by a discoverable device can be encrypted using conventional encryption techniques, such as DES encryption. In this way, the presence of a discoverable device in a space and/or its network address could only be ascertained by a discovering device possessing the ability to decrypt the signals. This would allow access to certain devices to be limited to persons previously granted access rights.

2.3.3 Confirmation of Physical Presence

Yet another added security measure that can be implemented in the present discovery system and process for situations where a user wants to establish communications with another device in the space via their portable computing device involves confirming the physical presence of a user within the space before a discoverable device would respond to a request for its network address. One way of accomplishing this is to include a confirmation button, switch or the like on the discoverable device. A user wanting to establish communications with a discoverable device would proceed as described previously for either the present IR-based or audio-based discovery techniques, except that a discoverable device will only transmit its network address if the aforementioned confirmation button has been activated on the device ahead of time. Thus, a user must physically activate the confirmation button on the discoverable device in order to obtain a signal containing the device's network address. In this way the user's physical presence within the space is confirmed.

Wherefore, what is claimed is:

1. A system for a discovering electronic device to discover the presence and network address of one or more discoverable electronic devices which are connected to the same network as the discovering device and which are located in the same delimited space as the discovering device, comprising:
    a general purpose computing device residing in the discovering electronic device;
    a computer program comprising program modules executable by the general purpose computing device, wherein the computing device is directed by the program modules of the computer program to,
        receive a signature signal transmitted by a one of said one or more discoverable electronic devices, wherein the signature signal comprises an indicator representing a signature of the discoverable device indicative of its presence in the delimited space, and its being accessible via said network, and what type of discoverable electronic device transmitted the signature signal,
        transmit a request signal for receipt by the discoverable electronic device whose signature was received which requests the address assigned to that discoverable device on the network to be transmitted to the discovering device, and
        receive a reply signal transmitted by the discoverable electronic device whose signature was received which comprises data representing the requested network address, wherein
        the signature, request and reply signals are not transmitted via the network and are transmitted in a manner that substantially limits their reception to the delimited space.

2. The system of claim 1, wherein the program module for transmitting a request signal is executed only for a discoverable device of the type that it is desired for the discovering device to establish communications with, wherein the device type is ascertained from the indicator included in the signature signal transmitted by the discoverable electronic device.

3. The system of claim 1, wherein the discovering device and each discoverable device comprises a microphone and loudspeaker for receiving and transmitting audio signals respectively, and wherein the signature, request and reply signals are audio signals.

4. The system of claim 3, wherein the signature signal is a low amplitude audio signal inaudible to humans which has the signature of the discoverable electronic device responsible for transmitting it embedded therein in the form an audio watermark, and wherein the program module for receiving a signature signal comprises a sub-module for obtaining the discoverable device's signature from the audio watermark.

5. The system of claim 3, wherein the program module for transmitting a request signal comprises a sub-module for generating the request signal in the form of a low amplitude audio signal inaudible to humans which has the address request embedded therein as an audio watermark, such that the discoverable device receiving the request signal obtains the address request from the audio watermark.

6. The system of claim 3, wherein the reply signal is a low amplitude audio signal inaudible to humans which has the data representing the requested network address embedded therein in the form an audio watermark, and wherein the program module for receiving a reply signal comprises a sub-module for obtaining the discoverable device's network address from the audio watermark.

7. The system of claim 3, wherein the signature signal is an audio signal audible to humans which has the signature of the discoverable electronic device responsible for transmitting it encoded therein, and wherein the program module for receiving a signature signal comprises a sub-module for decoding the discoverable device's signature from the signature signal.

8. The system of claim 3, wherein the program module for transmitting a request signal comprises a sub-module for generating the request signal in the form of an audio signal audible to humans which has the address request encoded therein, such that the discoverable device receiving the request signal obtains the address request by decoding the request signal.

9. The system of claim 3, wherein the reply signal is an audio signal audible to humans which has the data representing the requested network address encoded therein, and wherein the program module for receiving a reply signal comprises a sub-module for decoding the discoverable device's network address from the reply signal.

10. The system of claim 1, wherein the signature signal is transmitted by a discoverable electronic device on a periodic basis.

11. The system of claim 1, wherein the signature signal transmitted by a discoverable electronic device is encrypted, and wherein the program module for receiving the signature signal transmitted by a discoverable electronic device comprises a sub-module for decrypting the signal.

12. The system of claim 1, wherein the reply signal transmitted by a discoverable electronic device is encrypted, and wherein the program module for receiving the reply signal transmitted by a discoverable electronic device comprises a sub-module for decrypting the signal.

13. The system of claim 1, wherein one or more of the discoverable devices further comprises a confirmation actuator which is only capable of being activated by person physically present in the delimited space, and wherein a person must activate the confirmation actuator on a discoverable device having one before that discoverable device will transmit the signature signal.

14. The system of claim 1, wherein one or more of the discoverable devices further comprises a confirmation actuator which is only capable of being activated by person physically present in the delimited space, and wherein a person must activate the confirmation actuator on a discoverable device having one before that discoverable device will transmit the reply signal.

15. The system of claim 1, wherein each discoverable device comprises an infrared (IR) transmitter and the discovering device comprises an IR receiver, and wherein the signal transmitted by a discoverable electronic device is an IR signal emitted from its IR transmitter, and wherein the program modules for the discovering device receiving the signature and reply signals transmitted by a discoverable electronic device comprises receiving the signal via its IR receiver.

16. The system of claim 15, wherein the IR transmitter of each discoverable electronic device is powerful enough to extend throughout the delimited space.

17. The system of claim 1, wherein the program module for transmitting the request signal, comprises a sub-module for specifying the type of discoverable electronic device it is desired to obtain the network address for, such that only the discoverable electronic device of the specified type which is presence in the delimited space and accessible via said network transmits a reply signal.

* * * * *